(12) United States Patent
Velichko et al.

(10) Patent No.: US 12,407,954 B2
(45) Date of Patent: Sep. 2, 2025

(54) IMAGE SENSORS HAVING HIGH DYNAMIC RANGE PIXELS

(71) Applicant: SEMICONDUCTOR COMPONENTS INDUSTRIES, LLC, Phoenix, AZ (US)

(72) Inventors: Sergey Velichko, Boise, ID (US); Manuel H. Innocent, Wezemaal (BE); Richard Mauritzson, Meridian, ID (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 319 days.

(21) Appl. No.: 18/067,493

(22) Filed: Dec. 16, 2022

(65) Prior Publication Data
US 2024/0205562 A1    Jun. 20, 2024

(51) Int. Cl.
*H04N 25/77* (2023.01)
*H04N 25/78* (2023.01)
*H04N 25/79* (2023.01)

(52) U.S. Cl.
CPC ............ *H04N 25/77* (2023.01); *H04N 25/78* (2023.01); *H04N 25/79* (2023.01)

(58) Field of Classification Search
CPC .... H04N 5/351; H04N 5/37455; H04N 5/378; H04N 25/51; H04N 25/57; H04N 25/79; H04N 25/78; H04N 25/77
See application file for complete search history.

(56) References Cited

U.S. PATENT DOCUMENTS

| | | |
|---|---|---|
| 10,014,333 B2 | 7/2018 | Velichko et al. |
| 10,110,840 B2 | 10/2018 | Velichko |

(Continued)

FOREIGN PATENT DOCUMENTS

| | | |
|---|---|---|
| DE | 102017200698 A1 | 9/2017 |
| DE | 102020004050 A1 | 1/2021 |
| DE | 102020119179 A1 | 1/2021 |

OTHER PUBLICATIONS

Jae-kyu Lee et al., " A 2.1e- Temporal Noise and -105 dB Parasitic Light Sensitivity Backside-Illuminated 2.3 μm-Pixel Voltage-Domain Global Shutter CMOS Image Sensor Using High-Capacity DRAM Capacitor Technology," ISSCC 2020, pp. 102-103.

(Continued)

*Primary Examiner* — Xi Wang
(74) *Attorney, Agent, or Firm* — Treyz Law Group, P.C.; Joseph F. Guihan

(57) ABSTRACT

An image sensor may include an array of imaging pixels arranged in rows and columns. Each imaging pixel may include a photodiode, an overflow capacitor, an overflow transistor that is interposed between the photodiode and the overflow capacitor, a floating diffusion region, a transfer transistor that is interposed between the photodiode and the floating diffusion region, a voltage supply, and a reset transistor that is interposed between the floating diffusion region and the voltage supply. The voltage supply may provide a voltage at a first magnitude that is less than the pinning voltage for a first portion of a reset period and may provide the voltage at a second magnitude that is greater than the pinning voltage for a second portion of the reset period.

22 Claims, 12 Drawing Sheets

(56) References Cited

U.S. PATENT DOCUMENTS

| | | |
|---|---|---|
| 10,313,613 B2 | 6/2019 | Velichko |
| 11,343,439 B2 | 5/2022 | Johnson |
| 2012/0193516 A1 | 8/2012 | Bogaerts |
| 2020/0154066 A1 | 5/2020 | Johnson |
| 2021/0176417 A1* | 6/2021 | Xu ........................ H04N 25/772 |
| 2022/0264042 A1 | 8/2022 | Innocent et al. |

OTHER PUBLICATIONS

Geunsook Park et al., "A 2.2 μm Stacked Back Side Illuminated Voltage Domain Global Shutter CMOS Image Sensor," IEDM 2019, p. 16.4.1-16.4.4.

Xinyang Wang et al., "A 2.2M CMOS Image Sensor for High Speed Machine Vision Applications," SPIE vol. 7536, 2010.

* cited by examiner

IMAGE SENSORS HAVING HIGH DYNAMIC RANGE PIXELS

BACKGROUND

This relates generally to imaging devices, and more particularly, to imaging devices having high dynamic range imaging pixels.

Image sensors are commonly used in electronic devices such as cellular telephones, cameras, and computers to capture images. In a typical arrangement, an image sensor includes an array of image pixels arranged in pixel rows and pixel columns. Circuitry may be coupled to each pixel column for reading out image signals from the image pixels.

Typical image pixels contain a photodiode for generating charge in response to incident light. Image sensors can operate using a global shutter or a rolling shutter scheme. In a global shutter, every pixel in the image sensor may simultaneously capture an image, whereas in a rolling shutter each row of pixels may sequentially capture an image.

Some conventional image sensors may be able to operate in a high dynamic range (HDR) mode. HDR operation may be accomplished in image sensors by assigning alternate rows of pixels different integration times. However, conventional image sensors may sometimes experience lower than desired resolution, lower than desired sensitivity, higher than desired noise levels, and lower than desired quantum efficiency.

It is within this context that the embodiments described herein arise.

DETAILED DESCRIPTION

Embodiments of the present technology relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels (e.g., hundreds or thousands or more). A typical image sensor may, for example, have hundreds or thousands or millions of pixels (e.g., megapixels). Image sensors may include control circuitry such as circuitry for operating the pixels and readout circuitry for reading out image signals corresponding to the electric charge generated by the photosensitive elements.

Figure 1:
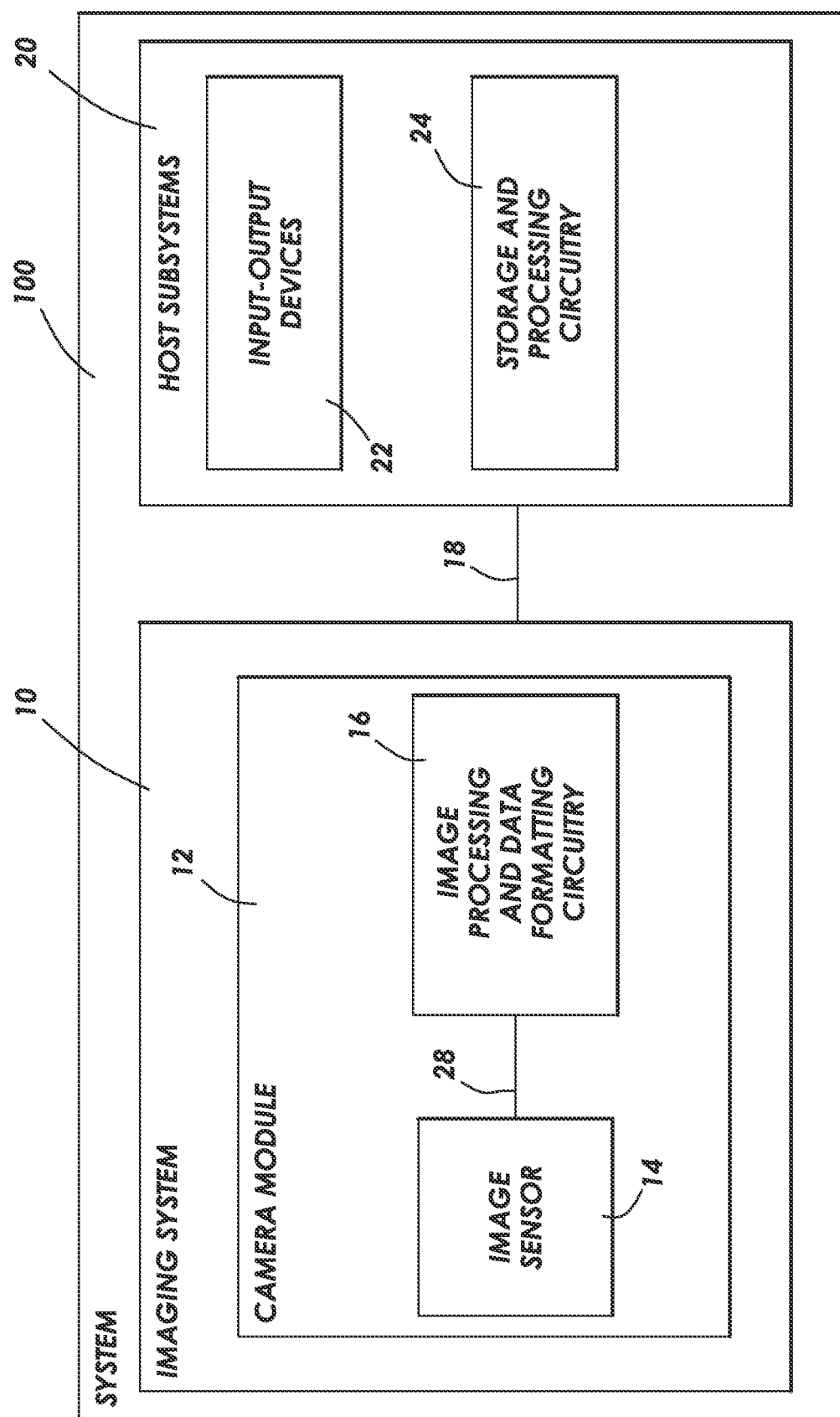
FIG. 1 is a diagram of an illustrative electronic device having an image sensor in accordance with some embodiments.

FIG. 1 is a diagram of an illustrative imaging and response system including an imaging system that uses an image sensor to capture images. System 100 of FIG. 1 may be an electronic device such as a camera, a cellular telephone, a video camera, or other electronic device that captures digital image data, may be a vehicle safety system (e.g., an active braking system or other vehicle safety system), or may be a surveillance system.

As shown in FIG. 1, system 100 may include an imaging system such as imaging system 10 and host subsystems such as host subsystem 20. Imaging system 10 may include camera module 12. Camera module 12 may include one or more image sensors 14, such as in an image sensor array integrated circuit, and one or more lenses.

During image capture operations, each lens may focus light onto an associated image sensor 14. Image sensor 14 may include photosensitive elements (i.e., image sensor pixels) that convert the light into digital data. Image sensors may have any number of pixels (e.g., hundreds, thousands, millions, or more). A typical image sensor may, for example, have millions of pixels (e.g., megapixels).

Each image sensor in camera module 12 may be identical or there may be different types of image sensors in a given image sensor array integrated circuit. In some examples, image sensor 14 may further include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), and/or address circuitry.

Still and video image data from sensor 14 may be provided to image processing and data formatting circuitry 16 via path 28. Image processing and data formatting circuitry 16 may be used to perform image processing functions such as data formatting, adjusting white balance and exposure, implementing video image stabilization, or face detection. Image processing and data formatting circuitry 16 may additionally or alternatively be used to compress raw camera image files if desired (e.g., to Joint Photographic Experts Group or JPEG format).

In one example arrangement, such as a system on chip (SoC) arrangement, sensor 14 and image processing and data formatting circuitry 16 are implemented on a common semiconductor substrate (e.g., a common silicon image sensor integrated circuit die). If desired, sensor 14 and image processing circuitry 16 may be formed on separate semiconductor substrates. For example, sensor 14 and image processing circuitry 16 may be formed on separate substrates that have been stacked.

Imaging system 10 may convey acquired image data to host subsystem 20 over path 18. Host subsystem 20 may include input-output devices 22 and storage processing circuitry 24. Host subsystem 20 may include processing software for detecting objects in images, detecting motion of objects between image frames, determining distances to objects in images, or filtering or otherwise processing images provided by imaging system 10. For example, image processing and data formatting circuitry 16 of the imaging system 10 may communicate the acquired image data to storage and processing circuitry 24 of the host subsystems 20.

If desired, system 100 may provide a user with numerous high-level functions. In a computer or cellular telephone, for example, a user may be provided with the ability to run user applications. For these functions, input-output devices 22 of host subsystem 20 may include keypads, input-output ports, buttons, and displays and storage and processing circuitry 24. Storage and processing circuitry 24 of host subsystem 20 may include volatile and/or nonvolatile memory (e.g., random-access memory, flash memory, hard drives, solid-state drives, etc.). Storage and processing circuitry 24 may additionally or alternatively include microprocessors, microcontrollers, digital signal processors, and/or application specific integrated circuits.

Figure 2:
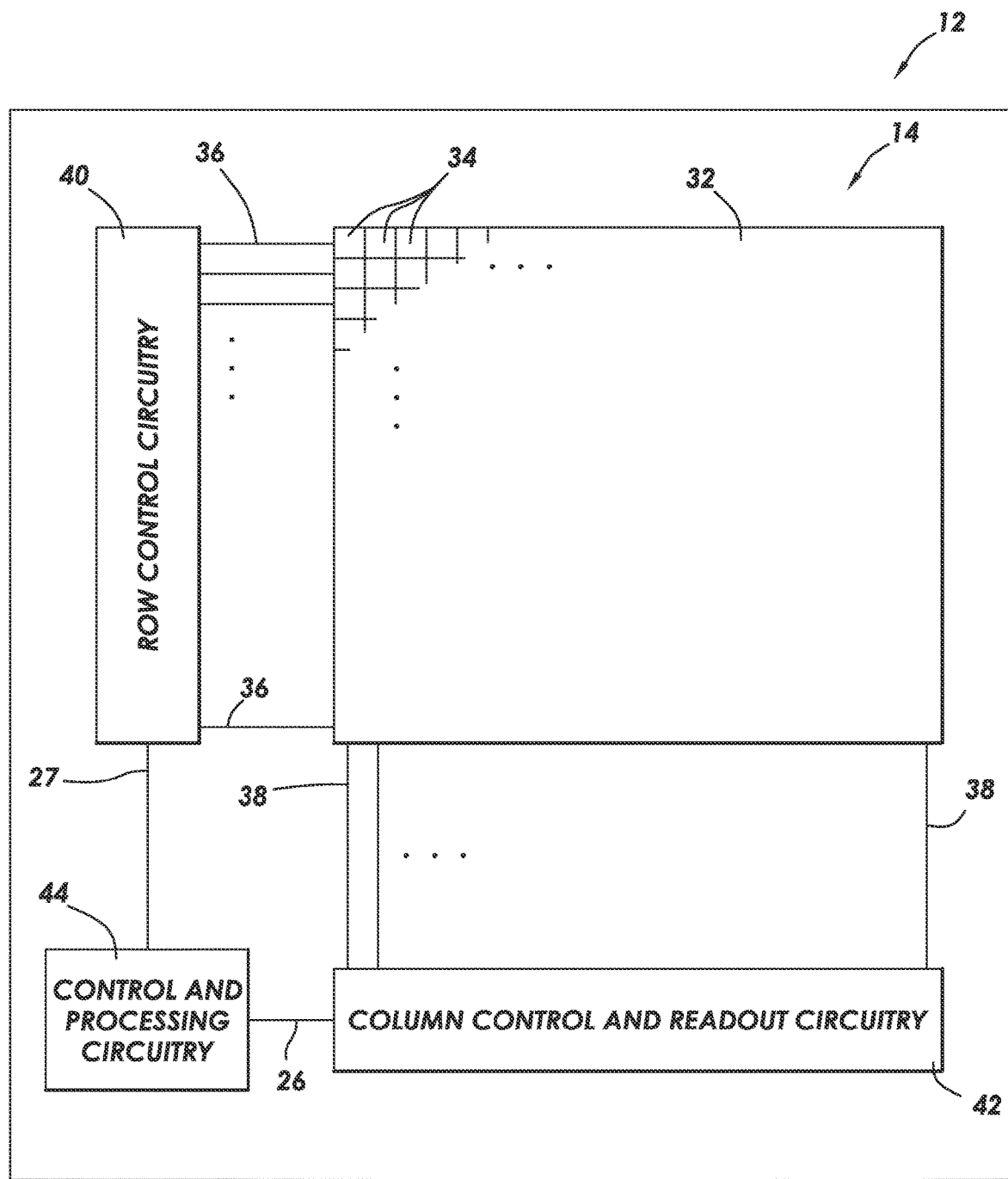
FIG. 2 is a diagram of an illustrative pixel array and associated row and column control circuitry for reading out image signals from an image sensor in accordance with some embodiments.

An example of an arrangement of image sensor 14 of FIG. 1 is shown in FIG. 2. As shown in FIG. 2, image sensor 14 may include control and processing circuitry 44. Control and processing circuitry 44 (sometimes referred to as control and processing logic) may be part of image processing and data formatting circuitry 16 in FIG. 1 or may be separate from circuitry 16. Image sensor 14 may include a pixel array such as array 32 of pixels 34 (sometimes referred to herein as image sensor pixels, imaging pixels, or image pixels). Control and processing circuitry 44 may be coupled to row control circuitry 40 via control path 27 and may be coupled to column control and readout circuits 42 via data path 26.

Row control circuitry 40 may receive row addresses from control and processing circuitry 44 and may supply corresponding row control signals to image pixels 34 over one or more control paths 36. The row control signals may include pixel reset control signals, charge transfer control signals, blooming control signals, row select control signals, dual conversion gain control signals, or any other desired pixel control signals.

Column control and readout circuitry 42 may be coupled to one or more of the columns of pixel array 32 via one or more conductive lines such as column lines 38. A given column line 38 may be coupled to a column of image pixels 34 in image pixel array 32 and may be used for reading out image signals from image pixels 34 and for supplying bias signals (e.g., bias currents or bias voltages) to image pixels 34. In some examples, each column of pixels may be coupled to a corresponding column line 38. For image pixel readout operations, a pixel row in image pixel array 32 may be selected using row driver circuitry 40 and image data associated with image pixels 34 of that pixel row may be read out by column readout circuitry 42 on column lines 38. Column readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, or column memory for storing the readout signals and any other desired data. Column control and readout circuitry 42 may output digital pixel readout values to control and processing logic 44 over line 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure. Features described herein as rows may be arranged vertically and features described herein as columns may be arranged horizontally.

Pixel array 32 may be provided with a color filter array having multiple color filter elements which allows a single image sensor to sample light of different colors. As an example, image sensor pixels such as the image pixels in array 32 may be provided with a color filter array which allows a single image sensor to sample red, green, and blue (RGB) light using corresponding red, green, and blue image sensor pixels. The red, green, and blue image sensor pixels may be arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another example, broadband image pixels having broadband color filter elements (e.g., clear color filter elements, yellow color filter elements, etc.) may be used instead of green pixels in a Bayer pattern. These examples are merely illustrative and, in general, color filter elements of any desired color and in any desired pattern may be formed over any desired number of image pixels 34.

In some implementations, array 32 may be part of a stacked-die arrangement in which pixels 34 of array 32 are split between two or more stacked substrates. In such an arrangement, each of the pixels 34 in the array 32 may be split between the two dies at any desired node within the pixel. As an example, a node such as the floating diffusion node may be formed across two dies. Pixel circuitry that includes the photodiode and the circuitry between the photodiode and the desired node (such as the floating diffusion node, in the present example) may be formed on a first die, and the remaining pixel circuitry may be formed on a second die. The desired node may be formed on (i.e., as a part of) a coupling structure (such as a conductive pad, a micro-pad, a conductive interconnect structure, or a conductive via) that connects the two dies. Before the two dies are bonded, the coupling structure may have a first portion on the first die and may have a second portion on the second die. The first die and the second die may be bonded to each other such that first portion of the coupling structure and the second portion of the coupling structure are bonded together and are electrically coupled. If desired, the first and second portions of the coupling structure may be compression bonded to each other. However, this is merely illustrative. If desired, the first and second portions of the coupling structures formed on the respective first and second dies may be bonded together using any metal-to-metal bonding technique, such as soldering or welding.

As mentioned above, the desired node in the pixel circuit that is split across the two dies may be a floating diffusion node. Alternatively, the desired node in the pixel circuit that is split across the two dies may be any other node along the pixel circuit. In one alternative, the desired node split across two dies may be the node between a floating diffusion region and the gate of a source follower transistor. For example, the floating diffusion node may be formed on the first die on which the photodiode is formed, while the coupling structure may connect the floating diffusion node to the source follower transistor on the second die. In another alternative, the desired node split across two dies may be the node between a floating diffusion region and a source-drain node of a transfer transistor. For example, the floating diffusion node may be formed on the second die on which the photodiode is not located. In yet another alternative, the desired node split across two dies may be the node between a source-drain node of a source follower transistor and a row select transistor.

In general, array 32, row control circuitry 40, and column control and readout circuitry 42 may be split between two or more stacked substrates. In one example, array 32 may be formed in a first substrate and row control circuitry 40 and column control and readout circuitry 42 may be formed in a second substrate. In another example, array 32 may be split between first and second substrates (using one of the pixel splitting schemes described above) and row control circuitry 40 and column control and readout circuitry 42 may be formed in a third substrate. In other examples, row control circuitry 40 may be on a separate substrate from column control and readout circuitry 42. In yet another example, row control circuitry 40 may be split between two or more substrates and/or column control and readout circuitry 42 may be split between two or more substrates.

Figure 3:
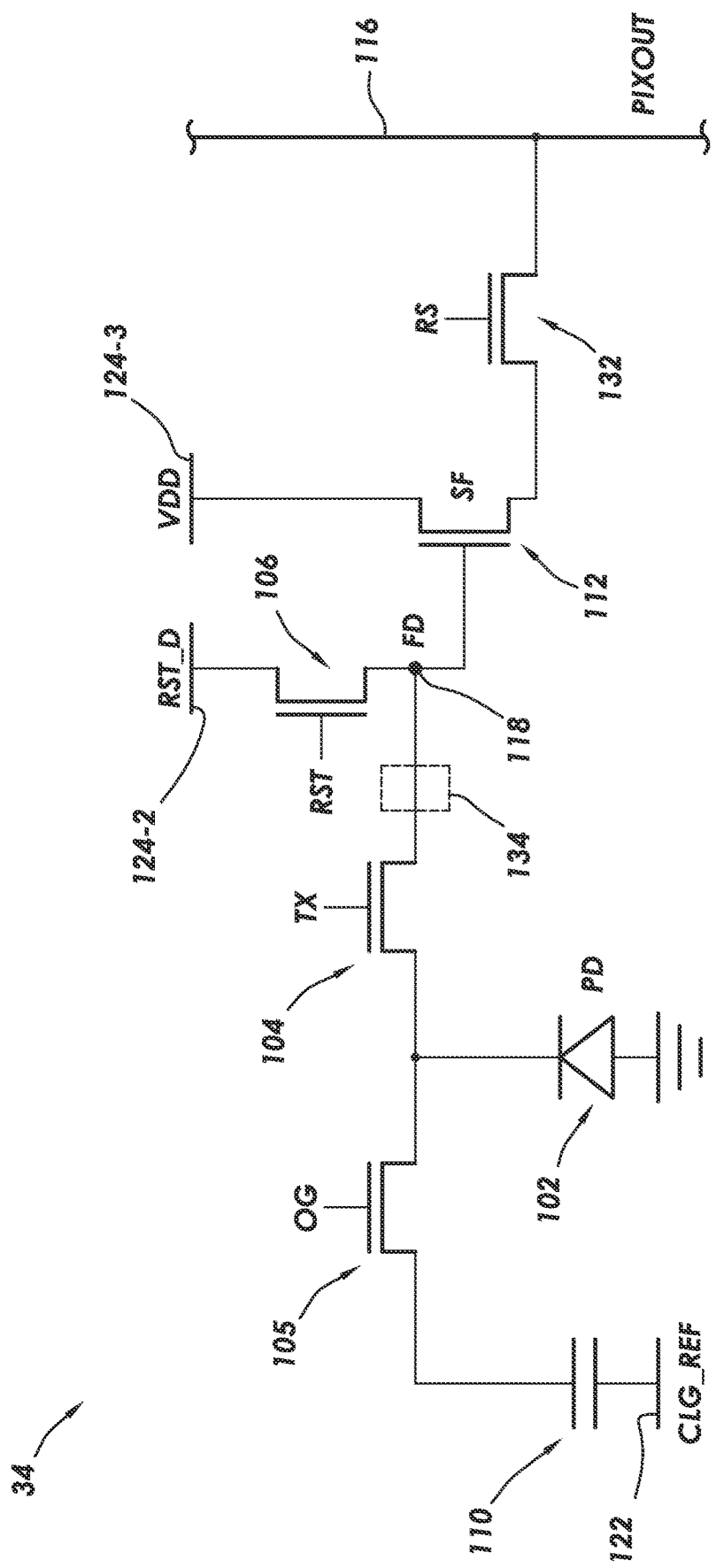
FIG. 3 is a circuit diagram of an illustrative imaging pixel that includes an overflow capacitor in accordance with some embodiments.

FIG. 3 is a circuit diagram of an imaging pixel having a photosensitive element and a storage capacitor. As shown in FIG. 3, image pixel 34 includes photosensitive element 102 (e.g., a photodiode) that generates charge in response to incident light. Photosensitive element 102 has a first terminal that is coupled to ground. Photosensitive element 102 may be a pinned photodiode with a corresponding pinning voltage. The second terminal of photosensitive element 102 is coupled to transfer transistor 104 and transistor 105. Transfer transistor 104 is coupled to floating diffusion (FD) region 118. Transistor 105 (sometimes referred to as threshold transistor 105 or overflow transistor 105) is coupled between photodiode 102 and storage capacitor 110 (sometimes referred to as overflow capacitor 110). Capacitor 110 has a first plate coupled to transistor 105 and a second plate coupled to a voltage supply 122. Herein, a voltage supply may sometimes alternatively be referred to as a voltage supply terminal, bias voltage supply terminal, bias voltage supply, etc. A reset transistor 106 may be coupled between floating diffusion region 118 and voltage supply 124-2. Voltage supply 122 may provide an adjustable voltage CLG_REF whereas voltage supply 124-2 may provide an adjustable voltage RST_D. Floating diffusion region 118 may be a doped semiconductor region (e.g., a region in a silicon substrate that is doped by ion implantation, impurity diffusion, or other doping process). Floating diffusion 118 has an associated capacitance.

Source follower transistor 112 (SF) has a gate terminal coupled to floating diffusion region 118 and a first terminal of reset transistor 106. Source follower transistor 112 also has a first source-drain terminal coupled to voltage supply 124-3. In this application, each transistor is illustrated as having three terminals: a source, a drain, and a gate. The source and drain terminals of each transistor may be changed depending on how the transistors are biased and the type of transistor used. For the sake of simplicity, the source and drain terminals are referred to herein as source-drain terminals or simply terminals. Voltage supply 124-3 may provide a power supply voltage VDD. A second source-drain terminal of source follower transistor 112 is coupled to transistor 132.

Transistor 132 (sometimes referred to as a row select transistor) is interposed between source follower transistor 112 and column output line 116. An output voltage (PIX-OUT) is provided on column output line 116 when row select transistor 132 is asserted.

Source follower transistor 112, row select transistor 132, and column output line 116 may sometimes collectively be referred to as a readout circuit or as readout circuitry. Other readout circuits may be used if desired.

A gate terminal of overflow transistor 105 receives control signal OG. A gate terminal of transfer transistor 104 receives control signal TX. A gate terminal of reset transistor 106 receives control signal RST. A gate terminal of row select transistor 132 receives control signal RS. Control signals OG, TX, RST, and RS may be provided by row control circuitry (e.g., row control circuitry 40 in FIG. 2) over control paths (e.g., control paths 36 in FIG. 2). The adjustable voltages at power supplies 122 and 124-2 may also be provided by row control circuitry if desired.

Figure 4:
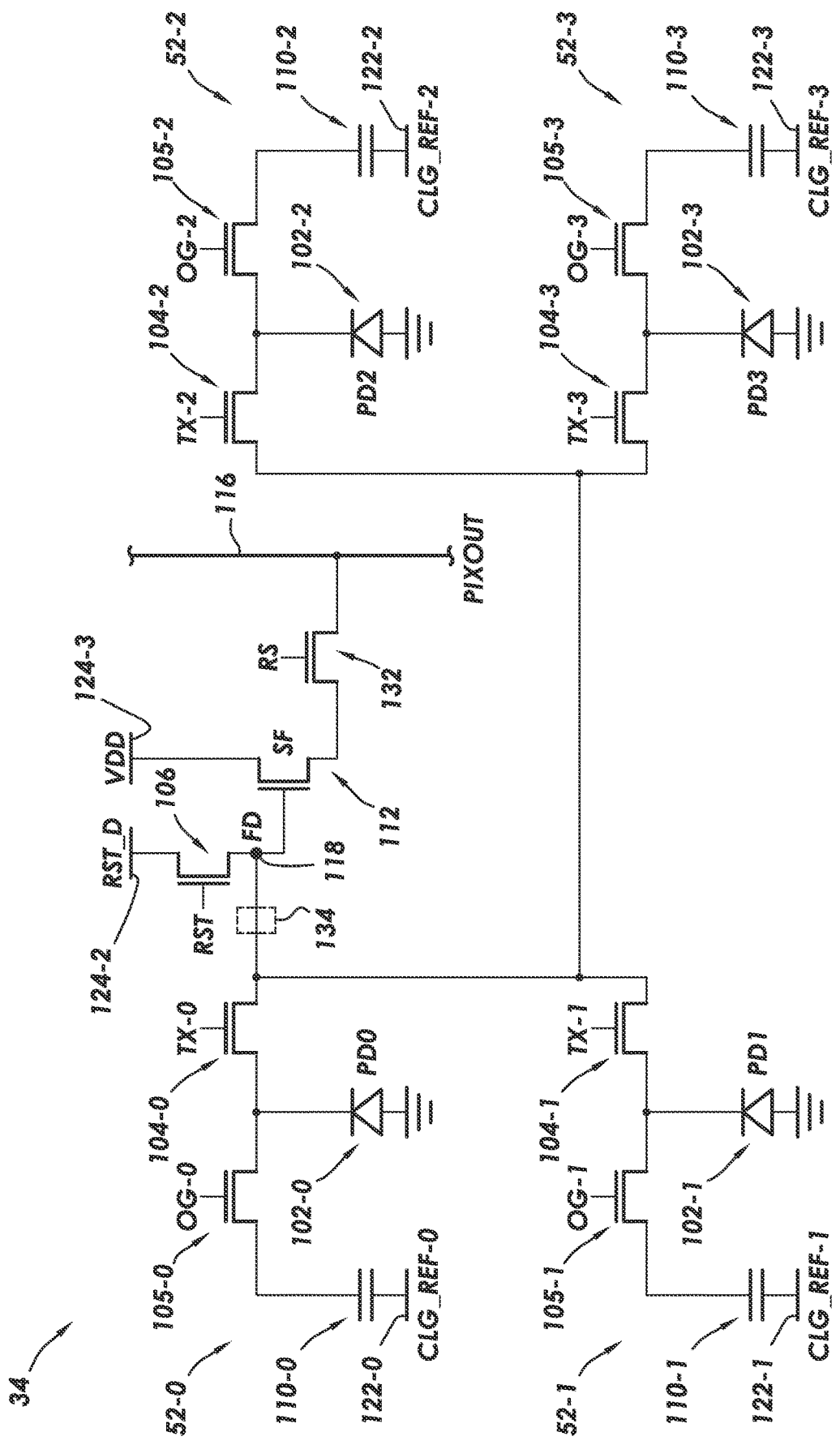
FIG. 4 is a circuit diagram of an illustrative imaging pixel that includes multiple sub-pixels with respective overflow capacitors in accordance with some embodiments.

The pixel of FIG. 3 has one photosensitive portion (with photodiode 102) for a corresponding readout circuit. This example is merely illustrative. If desired, multiple photosensitive portions having the same arrangement as in FIG. 3 may share a single readout circuit. FIG. 4 is a circuit diagram of an imaging pixel having four photosensitive portions (each including a respective photosensitive element and a respective storage capacitor). The four photosensitive portions in the imaging pixel of FIG. 4 all share a common readout circuit. The photosensitive portions are sometimes referred to herein as sub-pixels. The example of four sub-pixels sharing a common readout circuit in FIG. 4 is merely illustrative. In general, any desired number of sub-pixels in any desired layout may share a common readout circuit.

As shown in FIG. 4, a first photosensitive portion of imaging pixel 34 (sometimes referred to as a first sub-pixel 52-0) includes a photodiode 102-0, transfer transistor 104-0, overflow transistor 105-0, and storage capacitor 110-0. The arrangement of these components is the same in FIG. 4 as in FIG. 3 and will therefore not be described again.

A gate terminal of overflow transistor 105-0 receives control signal OG-0. A gate terminal of transfer transistor 104-0 receives control signal TX-0. Capacitor 110-0 is coupled between transistor 105-0 and a voltage supply 122-0 that provides a voltage CLG_REF_0. Control signals OG-0 and TX-0 may be provided by row control circuitry (e.g., row control circuitry 40 in FIG. 2) over control paths (e.g., control paths 36 in FIG. 2).

A second photosensitive portion of imaging pixel 34 (sometimes referred to as a second sub-pixel 52-1) includes a photodiode 102-1, transfer transistor 104-1, overflow transistor 105-1, and storage capacitor 110-1. The arrangement of these components is the same in FIG. 4 as in FIG. 3 and will therefore not be described again.

A gate terminal of overflow transistor 105-1 receives control signal OG-1. A gate terminal of transfer transistor 104-1 receives control signal TX-1. Capacitor 110-1 is coupled between transistor 105-1 and a voltage supply 122-1 that provides a voltage CLG_REF_1. Control signals OG-1 and TX-1 may be provided by row control circuitry (e.g., row control circuitry 40 in FIG. 2) over control paths (e.g., control paths 36 in FIG. 2).

A third photosensitive portion of imaging pixel 34 (sometimes referred to as a third sub-pixel 52-2) includes a photodiode 102-2, transfer transistor 104-2, overflow transistor 105-2, and storage capacitor 110-2. The arrangement of these components is the same in FIG. 4 as in FIG. 3 and will therefore not be described again.

A gate terminal of overflow transistor 105-2 receives control signal OG-2. A gate terminal of transfer transistor 104-2 receives control signal TX-2. Capacitor 110-2 is coupled between transistor 105-2 and a voltage supply 122-2 that provides a voltage CLG_REF_2. Control signals OG-2 and TX-2 may be provided by row control circuitry (e.g., row control circuitry 40 in FIG. 2) over control paths (e.g., control paths 36 in FIG. 2).

A fourth photosensitive portion of imaging pixel 34 (sometimes referred to as a fourth sub-pixel 52-3) includes a photodiode 102-3, transfer transistor 104-3, overflow transistor 105-3, and storage capacitor 110-3. The arrangement of these components is the same in FIG. 4 as in FIG. 3 and will therefore not be described again.

A gate terminal of overflow transistor 105-3 receives control signal OG-3. A gate terminal of transfer transistor 104-3 receives control signal TX-3. Capacitor 110-3 is coupled between transistor 105-3 and a voltage supply 122-3 that provides a voltage CLG_REF_3. Control signals OG-3 and TX-3 may be provided by row control circuitry (e.g., row control circuitry 40 in FIG. 2) over control paths (e.g., control paths 36 in FIG. 2).

Each one of the transfer transistors in FIG. 4 is coupled to a common floating diffusion region 118. A reset transistor is coupled between the floating diffusion region and voltage supply 124-2. A source follower transistor 112 is coupled to floating diffusion region 118. The arrangement of floating diffusion region 118, reset transistor 106, voltage supplies 124-2 and 124-3, row select transistor 132, and column output line 116 is the same in FIG. 4 as in FIG. 3 and will not be described again.

Including multiple sub-pixels with a shared readout circuit (as in FIG. 4) may allow for each sub-pixel to have a small size. The small size may allow for a high resolution of photosensitive regions in the image sensor.

Figure 5:
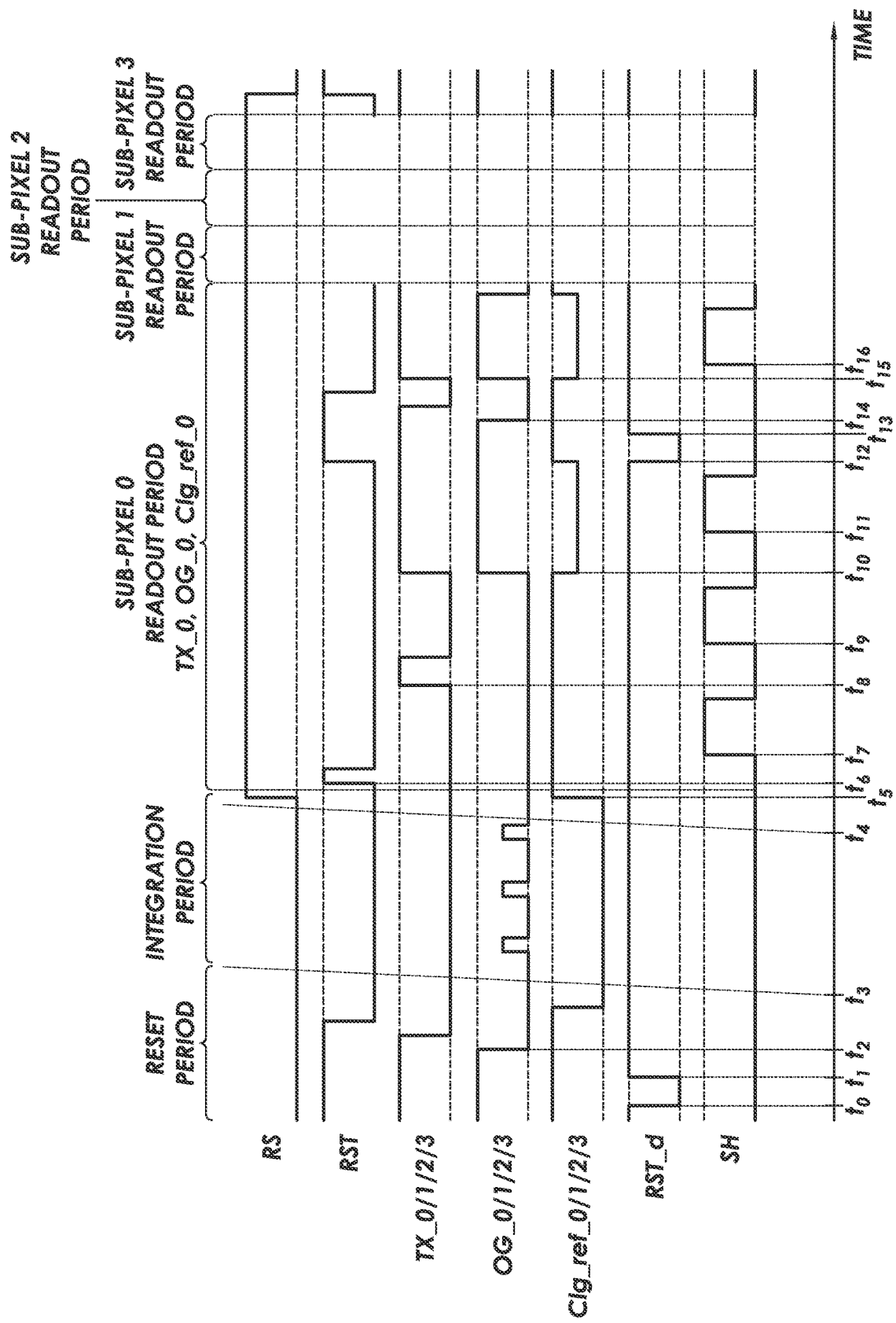
FIG. 5 is a timing diagram showing an illustrative method of operation for an imaging pixel such as the imaging pixel in FIG. 4 in accordance with some embodiments.

FIG. 5 is a timing diagram showing illustrative operation of the pixel in FIG. 4. First, there is a reset period up to and including $t_3$. During the reset period, at $t_0$, voltage RST_D (from voltage supply 124-2) is dropped low. Simultaneously, at $t_0$, the control signal RST is high (meaning that transistor 106 is asserted), the control signals TX_0, TX_1, TX_2, and TX_3 are high (meaning that transfer transistors 104-0, 104-1, 104-2, and 104-3 are asserted), the control signals OG_0, OG_1, OG_2, and OG_3 are high (meaning that overflow transistors 105-0, 105-1, 105-2, and 105-3 are asserted), and voltages CLG_REF_0, CLG_REF_1, CLG_REF_2, and CLG_REF_3 (at voltage supplies 122-0, 122-1, 122-2, and 122-3, respectively) are high.

For simplicity, the subsequent operations will now be described in detail with respect to a single sub-pixel (e.g., sub-pixel 52-0 with photodiode 102-0, capacitor 110-0, transistor 104-0, and transistor 105-0 in FIG. 4). However, it should be understood that, during the reset period and integration period, the same operations are simultaneously or consecutively being performed for the other sub-pixels.

Between $t_0$ and $t_1$, capacitor 110-0 is electrically connected to voltage supply 124-2 through transistor 105-0, photodiode 102-0, transistor 104-0, floating diffusion region 118, and reset transistor 106. When voltage RST_D is low (between $t_0$ and $t_1$), capacitor 110-0 is reset to voltage RST_D. The low voltage of RST_D (between $t_0$ and $t_1$) is lower than the pinning voltage of photodiode 102-0. When the voltage RST_D is lower than the pinning voltage, capacitor 110-0 will be reset to RST_D. Resetting capacitor 110-0 to RST_D (while RST_D is lower than the pinning voltage) may be referred to as a hard reset.

At $t_1$, RST_D is raised to a second, higher level compared to the first, low level between to and $t_1$. Between $t_1$ and $t_2$, capacitor 110-0 is electrically connected to voltage supply 124-2 through transistor 105-0, photodiode 102-0, transistor 104-0, floating diffusion region 118, and reset transistor 106. However, because RST_D is above the pinning voltage of photodiode 102-0, the voltage of capacitor 110-0 will increase (e.g., following RST_D) up to but not exceeding the pinning voltage of photodiode 102-0. In other words, raising RST_D above the pinning voltage between $t_1$ and $t_2$ effectively resets capacitor 110-0 to the pinning voltage. Resetting the capacitor 110-0 to the pinning voltage (as between $t_1$ and $t_2$) may sometimes be referred to as a soft reset.

Starting at $t_2$, control signal RST, TX_0, and OG_0 may be brought low (deasserting transistors 106, 104-0, and 105-0, respectively).

The reset operations in FIG. 5 may be referred to as a hard-soft reset (because the capacitor first undergoes a hard reset between $t_0$ and $t_1$ and then undergoes a soft reset between $t_1$ and $t_2$). Using a hard-soft reset may advantageously remove any residue from the previous frame, which may mitigate noise associated with lag at the capacitor. This example of a reset operation is merely illustrative. It should be understood that other reset operations may be performed if desired (e.g., a soft reset only).

As shown in FIG. 5, an integration period may follow the reset period. The integration period may occur between $t_3$ and $t_4$. Before the start of the integration period, CLG_REF_0 may optionally be dropped low. CLG_REF_0 may be kept low throughout the integration period to reduce dark current during the integration period. During the integration time, charge is generated and accumulates (is integrated) in photodiode 102-0. Transistor 105-0 may be continuously or repeatedly partially pulsed (e.g., by holding OG_0 at an intermediate voltage) during the integration period to allow charge from photodiode 102-0 to overflow through transistor 105-0 to capacitor 110-0. As shown in FIG. 5, transistor 105-0 may optionally be pulsed one or more times during the integration period. Repeatedly pulsing transistor 105-0 (e.g., repeatedly asserting and deasserting the transistor) may ensure effective charge overflow from photodiode 102-0 into capacitor 110-0 while mitigating dark current. Instead of or in addition to pulsing transistor 105-0, transistor 105-0 may include a buried implant that allows charge from photodiode 102-0 to overflow through transistor 105-0 to capacitor 110-0.

At $t_5$, readout operations for the sub-pixel 52-0 are performed. The readout operations may be performed individually for each sub-pixel. In other words, there is a readout period for sub-pixel 52-0 after the integration period, followed by a readout period for sub-pixel 52-1, followed by a readout period for sub-pixel 52-2, and followed by a readout period for sub-pixel 52-3.

The readout operations for sub-pixel 52-0 will now be described. It should be understood that the readout operations for sub-pixel 52-0 use the corresponding control signals for sub-pixels 52-0 (e.g., TX_0, OG_0, CLG_REF_0). The readout operations for the other sub-pixels are the same as described for sub-pixel 52-0, only using the appropriate control signals (e.g., TX_1, OG_1, and CLG_REF_1 for sub-pixel 52-1).

At $t_5$, CLG_REF_0 is raised back high (after optionally being held low through the integration time). At $t_6$, the RST control signal is pulsed to assert reset transistor 106. Pulsing the reset transistor resets floating diffusion region 118 to RST_D from voltage supply 124-2. After resetting the floating diffusion region, the voltage at floating diffusion region 118 is sampled at $t_7$ (as indicated by the pulse in sample-and-hold SH in FIG. 5). This sample may be referred to as a reset sample or a photodiode reset sample.

Next, at $t_8$, the transfer transistor 104-0 is asserted by raising control signal TX_0. This transfers charge from photodiode 102-0 to floating diffusion region 118. After the charge is transferred from the photodiode, the voltage at floating diffusion region 118 is sampled at $t_9$ (as indicated by the pulse in sample-and-hold SH). This sample may be referred to as a signal sample or a photodiode signal sample.

The readout from photodiode 102-0 therefore includes a signal sample and a reset sample for double sampling. In double sampling, a reset signal and a signal sample are obtained during readout. The reset signal may then be subtracted from the signal sample during subsequent processing to help correct for noise. The double sampling may be correlated double sampling (in which the reset value is sampled before the signal value) or uncorrelated double sampling (in which the reset value is sampled after the signal value is sampled, sometimes referred to as simply double sampling).

During the readout operations of FIG. 5, the readout from photodiode 102-0 is a correlated double sampling readout.

After reading photodiode 102-0, the signal from capacitor 110-0 needs to be read out. Based on the topology of the pixel, the signal from capacitor 110-0 needs to be read out through photodiode 102-0. To achieve this, at $t_{10}$, control signal TX_0 is raised high to assert transistor 104-0, control signal OG_0 is raised high to assert transistor 105-0, and CLG_REF_0 is dropped. CLG_REF_0 may be dropped to an intermediate level, for example. The intermediate level for CLG_REF_0 may be between the low level used during the integration period and the high level used during the reset period. Asserting transistors 104-0 and 105-0 connects capacitor 110-0 to floating diffusion region 118. Lowering CLG_REF_0 at $t_{10}$ to the intermediate level may ensure that the signal passes through photodiode 102-0 to floating diffusion region 118.

After transferring the charge from capacitor 110-0 to floating diffusion region 118, the voltage at floating diffusion region 118 is sampled at $t_{11}$ (as indicated by the pulse in sample-and-hold SH). This sample may be referred to as a signal sample, a capacitor signal sample, or an overflow signal sample.

Next, the floating diffusion region 118 is reset. To mitigate noise, a hard-soft reset procedure is performed (that matches the reset procedure of the reset period between $t_0$ and $t_2$). At $t_{12}$, RST_D is dropped low while RST, CLF_REF_0, OG_0, and TG_0 are kept high. Between $t_{12}$ and $t_{13}$, capacitor 110-0 is electrically connected to voltage supply 124-2 through transistor 105-0, photodiode 102-0, transistor 104-0, floating diffusion region 118, and reset transistor 106. When voltage RST_D is low (between $t_{12}$ and $t_{13}$), capacitor 110-0 is reset to voltage RST_D. The low voltage of RST_D (between $t_{12}$ and $t_{13}$) is lower than the pinning voltage of photodiode 102-0. When the voltage RST_D is lower than the pinning voltage, capacitor 110-0 will be reset to RST_D. The aforementioned operation is the hard reset portion of the hard-soft reset operation.

At $t_{13}$, RST_D is raised to a second, higher level compared to the first, low level between $t_{12}$ and $t_{13}$. Between $t_{13}$ and $t_{14}$, capacitor 110-0 is electrically connected to voltage supply 124-2 through transistor 105-0, photodiode 102-0, transistor 104-0, floating diffusion region 118, and reset transistor 106. However, because RST_D is above the pinning voltage of photodiode 102-0, the voltage of capacitor 110-0 will increase (e.g., following RST_D) up to but not exceeding the pinning voltage of photodiode 102-0. In other words, raising RST_D above the pinning voltage between $t_{13}$ and $t_{14}$ effectively resets capacitor 110-0 to the pinning voltage. The aforementioned operation is the soft reset portion of the hard-soft reset operation.

Starting at $t_{14}$, control signal RST, TX_0, and OG_0 may be brought low (deasserting transistors 106, 104-0, and 105-0, respectively). At $t_{15}$, control signal TX_0 is raised high, OG_0 is raised high, and CLG_REF_0 is dropped to an intermediate level. The configuration at tis therefore matches the configuration at $t_{10}$ (before the signal level is sampled at $t_{11}$). At $t_{16}$, the voltage at floating diffusion region 118 is sampled. This sample from $t_{16}$ may be referred to as a reset sample, a capacitor reset sample, or an overflow reset sample.

During the readout operations of FIG. 5, the readout from photodiode 102-0 is an uncorrelated double sampling readout (because the reset level is sampled after the signal level).

It is noted that the timing diagram of FIG. 5 may be applied to the pixel of FIG. 3 in addition to the pixel of FIG. 4. When the timing diagram of FIG. 5 is applied to the pixel of FIG. 3, the readout of the second, third, and fourth sub-pixels is omitted. The timing diagram depicted in FIG. 5 may be applied to numerous other types of pixels, as will be now described.

Figure 6:
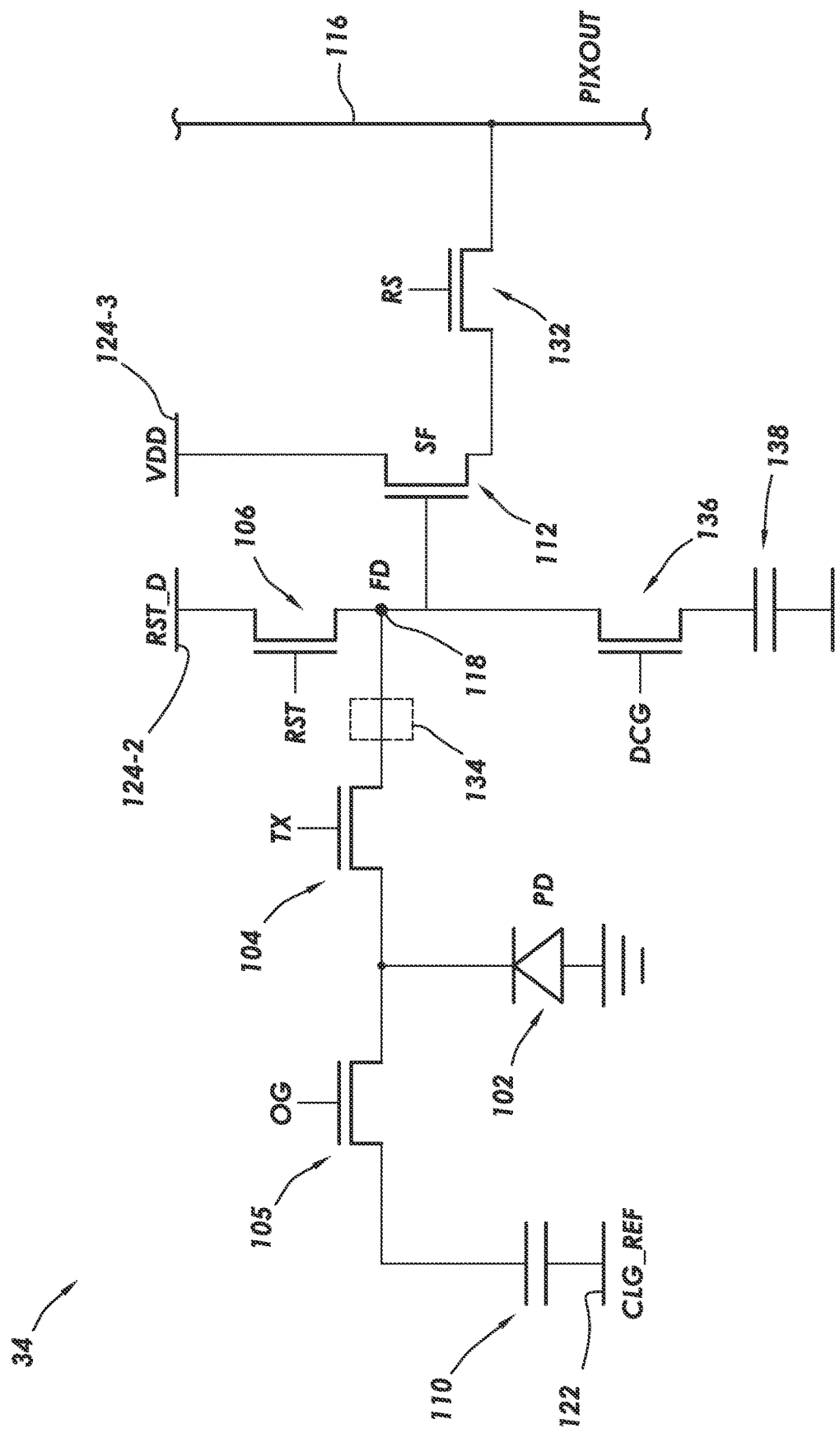
FIG. 6 is a circuit diagram of an illustrative imaging pixel that includes an overflow capacitor and a dual conversion gain capacitor in accordance with some embodiments.

One alternate pixel structure is shown in FIG. 6. The pixel in FIG. 6 is the same as the pixel in FIG. 3, but with an additional transistor 136 (sometimes referred to as a dual conversion gain transistor) that is be coupled between floating diffusion region 118 and an additional capacitor 138 (sometimes referred to as a dual conversion gain capacitor). The additional capacitor in this arrangement may allow for transferring charge from capacitor 110 to floating diffusion region 118 without charge sharing and without a knee point in the signal range of the floating diffusion region.

Figure 7:
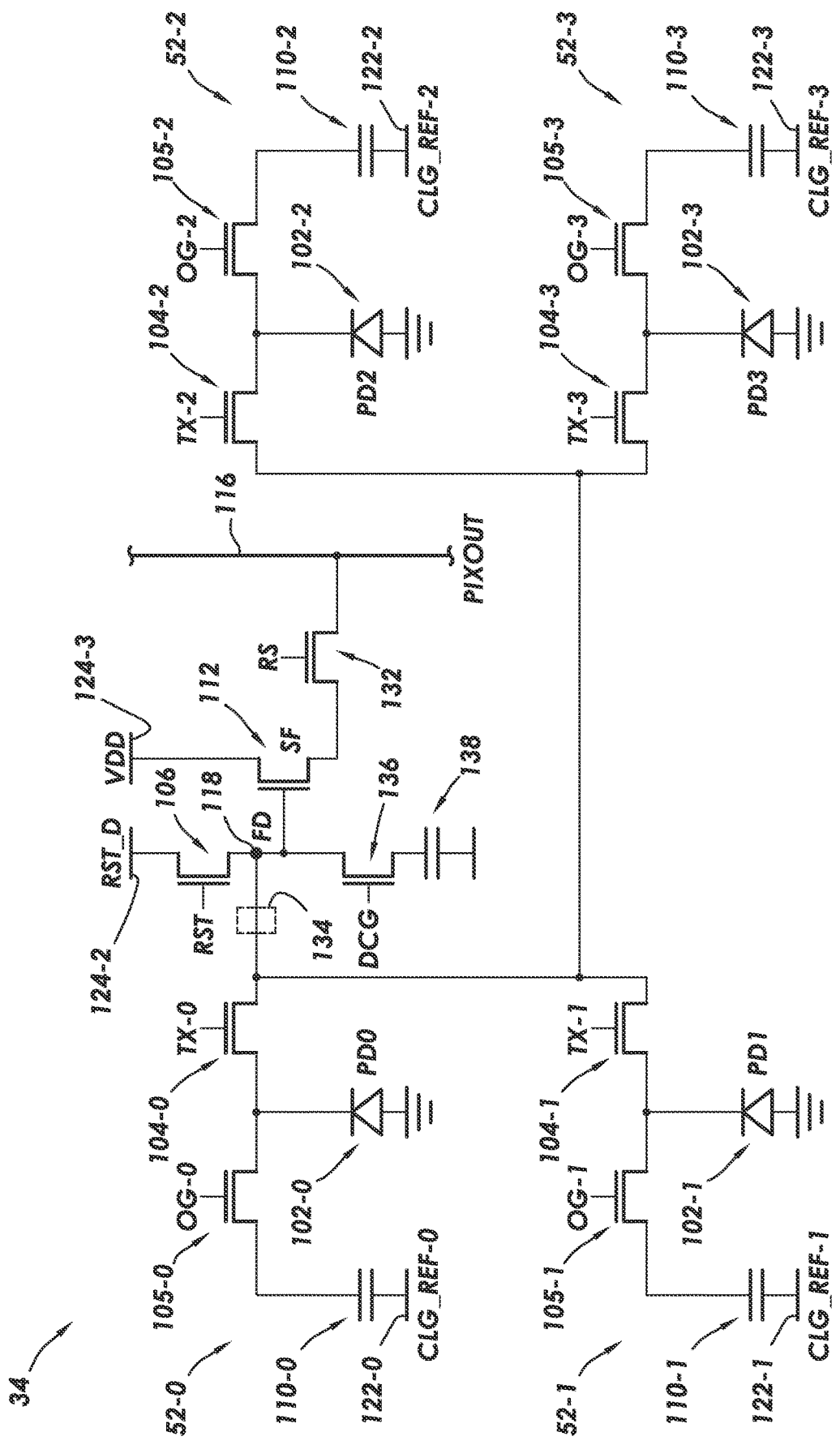
FIG. 7 is a circuit diagram of an illustrative imaging pixel that includes multiple sub-pixels with respective overflow capacitors and a shared dual conversion gain capacitor in accordance with some embodiments.

Another alternate pixel structure is shown in FIG. 7. The pixel in FIG. 7 is the same as the pixel in FIG. 4, but with the additional transistor 136 and capacitor 138 from FIG. 6. In FIG. 7, transistor 136 and capacitor 138 are shared between the multiple sub-pixels of the pixel.

Figure 8:
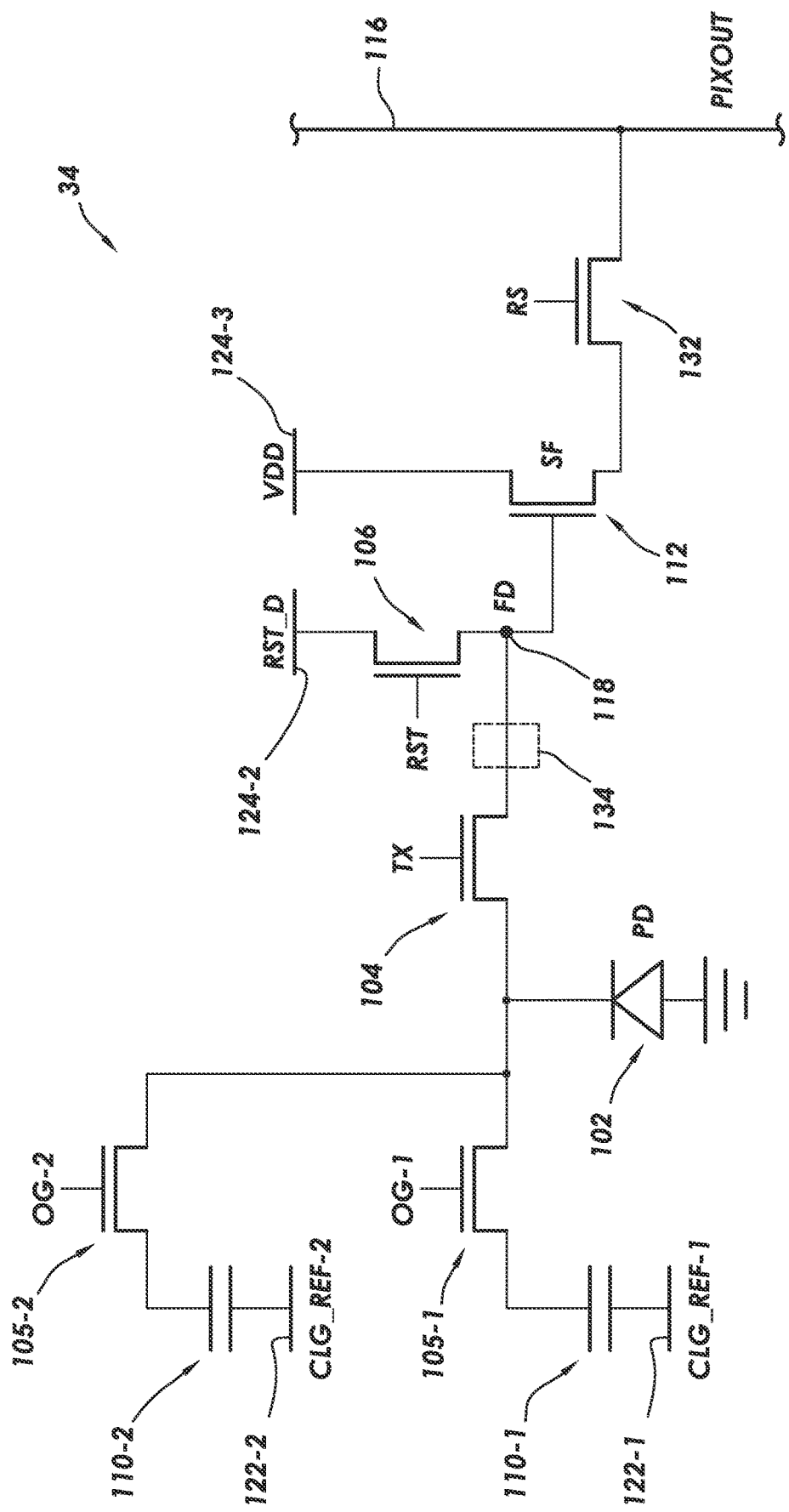
FIG. 8 is a circuit diagram of an illustrative imaging pixel that includes overflow capacitors coupled to a photodiode in parallel in accordance with some embodiments.

Another alternate pixel structure is shown in FIG. 8. The pixel in FIG. 8 is the same as the pixel in FIG. 3, but with parallel overflow capacitors. As shown in FIG. 8, charge from photodiode 102 may first overflow through a first transistor 105-1 to overflow capacitor 110-1. Capacitor 110-1 is coupled to an associated voltage supply 122-1. Once capacitor 110-1 is full, charge from photodiode 102 may next overflow through a second transistor 105-2 to overflow capacitor 110-2. Capacitor 110-2 is coupled to an associated voltage supply 122-2. During the integration period, there may also be an anti-blooming path to voltage supply 124-2 through transistor 104 and transistor 106.

Figure 9:
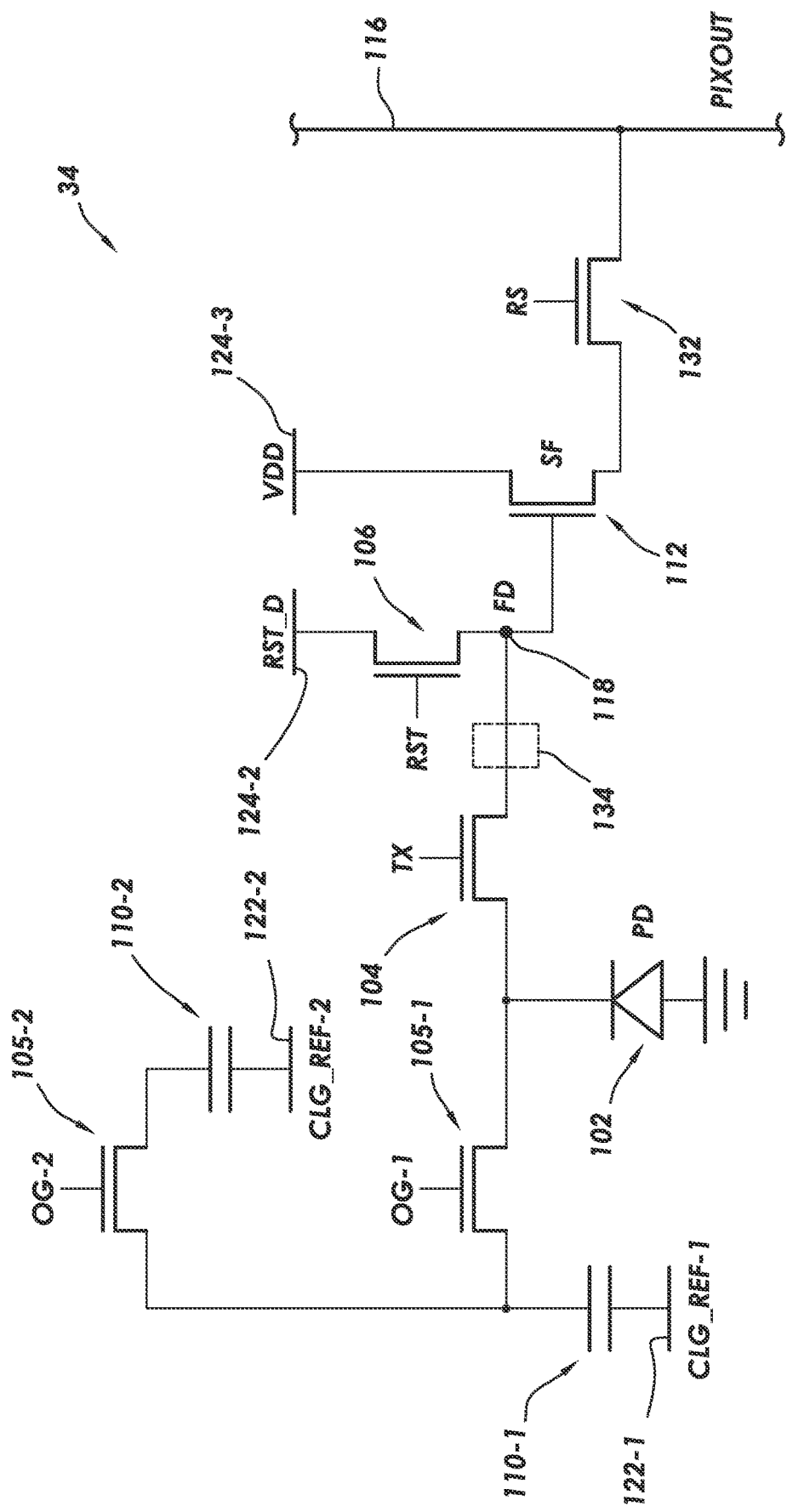
FIG. 9 is a circuit diagram of an illustrative imaging pixel that includes overflow capacitors coupled to a photodiode in series in accordance with some embodiments.

Instead of multiple overflow capacitors connected to the photodiode in parallel (as in FIG. 8), a pixel may have multiple overflow capacitors connected to the photodiode in series, as shown in FIG. 9. As shown in FIG. 9, charge from photodiode 102 may first overflow through a first transistor 105-1 to overflow capacitor 110-1. Capacitor 110-1 is coupled to an associated voltage supply 122-1. Once capacitor 110-1 is full, charge from photodiode 102 may next overflow through a second transistor 105-2 to overflow capacitor 110-2. Capacitor 110-2 is coupled to an associated voltage supply 122-2. During the integration period, there may also be an anti-blooming path to voltage supply 124-2 through transistor 104 and transistor 106. The rest of the pixel in FIG. 9 is the same as the pixel in FIG. 3.

Figure 10:
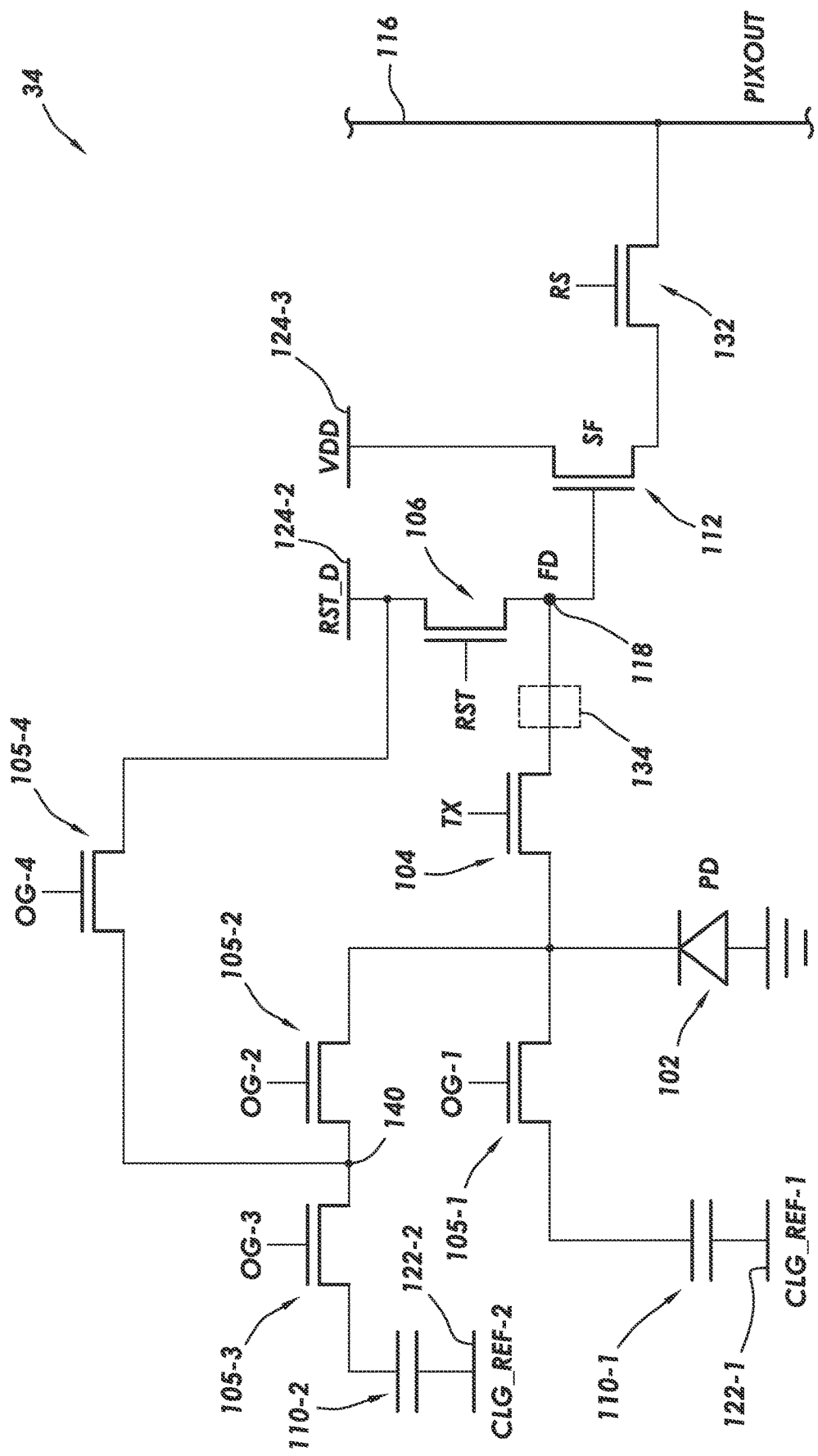
FIG. 10 is a circuit diagram of an illustrative imaging pixel that includes a coupled gate structure in accordance with some embodiments.

In another alternate pixel, shown in FIG. 10, a coupled gate structure may be included. As shown in FIG. 10, charge from photodiode 102 may first overflow through a first transistor 105-1 to overflow capacitor 110-1. Capacitor 110-1 is coupled to an associated voltage supply 122-1. Once capacitor 110-1 is full, charge from photodiode 102 may next overflow through a second transistor 105-2 to a node 140. A transistor 105-3 is coupled between node 140 and capacitor 110-2. A transistor 105-4 is coupled between node 140 and voltage supply 124-2. Once at node 140, the overflow charge may either be stored at capacitor 110-2 (when transistor 105-3 is asserted while transistor 105-4 is deasserted) or discarded (when transistor 105-4 is asserted while transistor 105-3 is deasserted). Transistors 105-3 and 105-4 may be asserted in a mutually exclusive fashion. In other words, asserting transistor 105-3 causes transistor 105-4 to be deasserted and asserting transistor 105-4 causes transistor 105-3 to be deasserted. The percentage of time that transistor 105-3 is asserted may be tuned to select the dynamic range of the pixel. The rest of the pixel in FIG. 10 is the same as the pixel in FIG. 3.

Other arrangements of overflow capacitors in series, overflow capacitor in parallel, and coupled gate structures (where charge is selectively stored or discarded using transistors asserted in mutually exclusively fashion) may be used if desired. In another alternative, a pixel may have a first overflow to a first capacitor and a second, coupled gate overflow from the first capacitor to a second capacitor. In other words, once the first capacitor is full the overflow charge is either discarded or stored in a second capacitor that is in series with the first capacitor. In another alternative, a pixel may have a first, coupled gate overflow to a first capacitor and a second overflow from the first capacitor to a second capacitor. In other words, overflow charge is either discarded or stored in a first capacitor. Once the first capacitor is full, the overflow charge is either discarded or stored in a second capacitor.

The methods of operation described herein may also be used in global shutter pixels, such as the global shutter pixels described in U.S. patent application Ser. No. 17/811,365, which is hereby incorporated by reference herein in its entirety.

Figure 11:
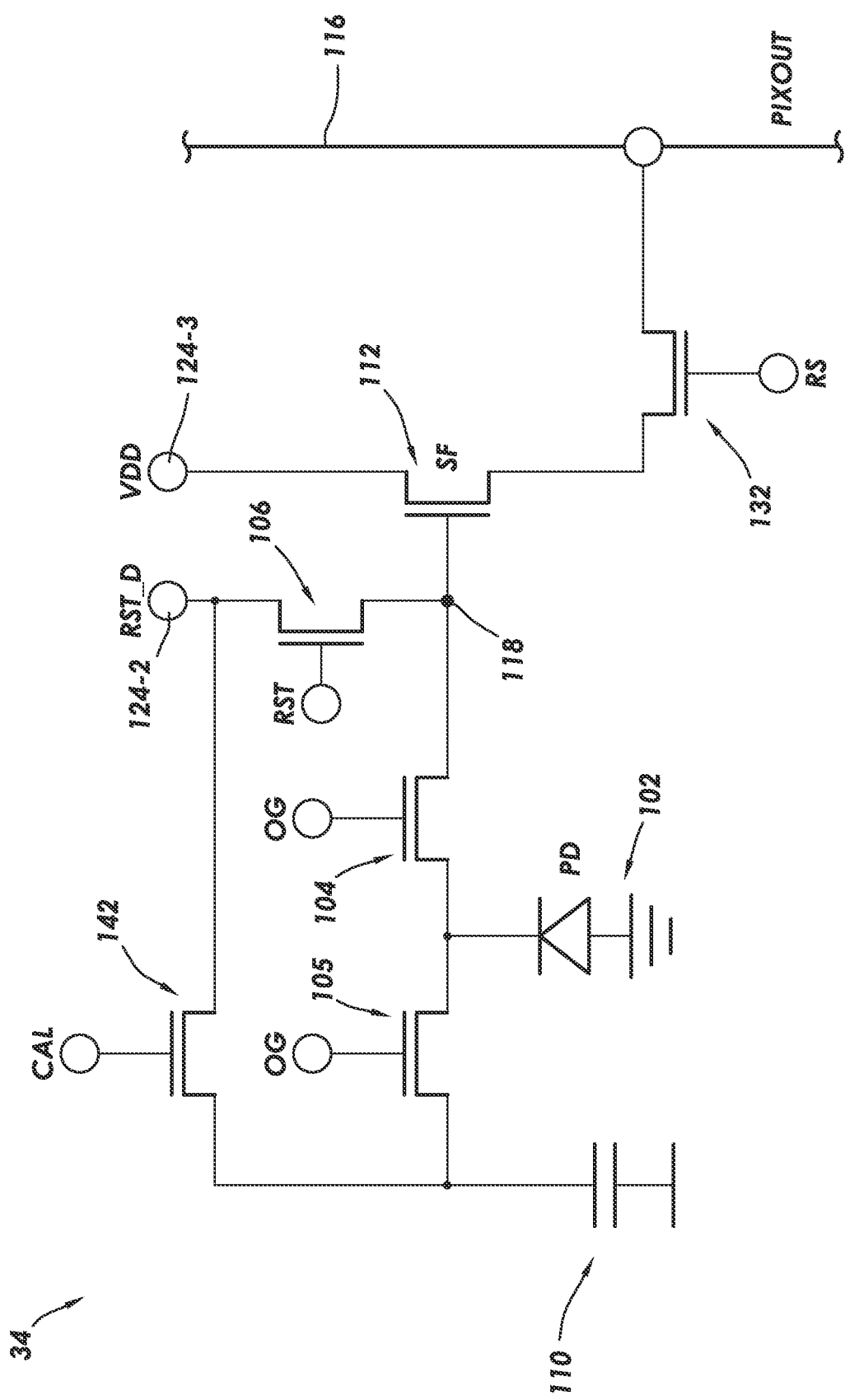
FIG. 11 is a circuit diagram of an illustrative imaging pixel that includes an overflow capacitor and a calibration transistor in accordance with some embodiments.

FIG. 11 is a diagram of a pixel with a calibration transistor that may be used during calibration operations for the pixel. As shown in FIG. 11, the pixel may include a photodiode 102, transfer transistor 104, floating diffusion region 118, source follower transistor 112, row select transistor 132, and column output line 116 (similar to as previously discussed in connection with FIG. 3). However, pixel 34 in FIG. 11 also includes a calibration transistor 142 that is coupled between capacitor 110 and voltage supply 124-2. Calibration transistor 142 has a gate that receives a control signal CAL.

The pinning voltage of the photodiode in each pixel may vary due to manufacturing variations. Including calibration transistor 142 allows for per-pixel pinning voltage calibration to be performed during operation of the image sensor, which mitigates variability among the pixels. The calibration transistor helps calibrate for a knee point in the response where the floating diffusion regions starts charge sharing with photodiode 102 and capacitor 110.

Figure 12:
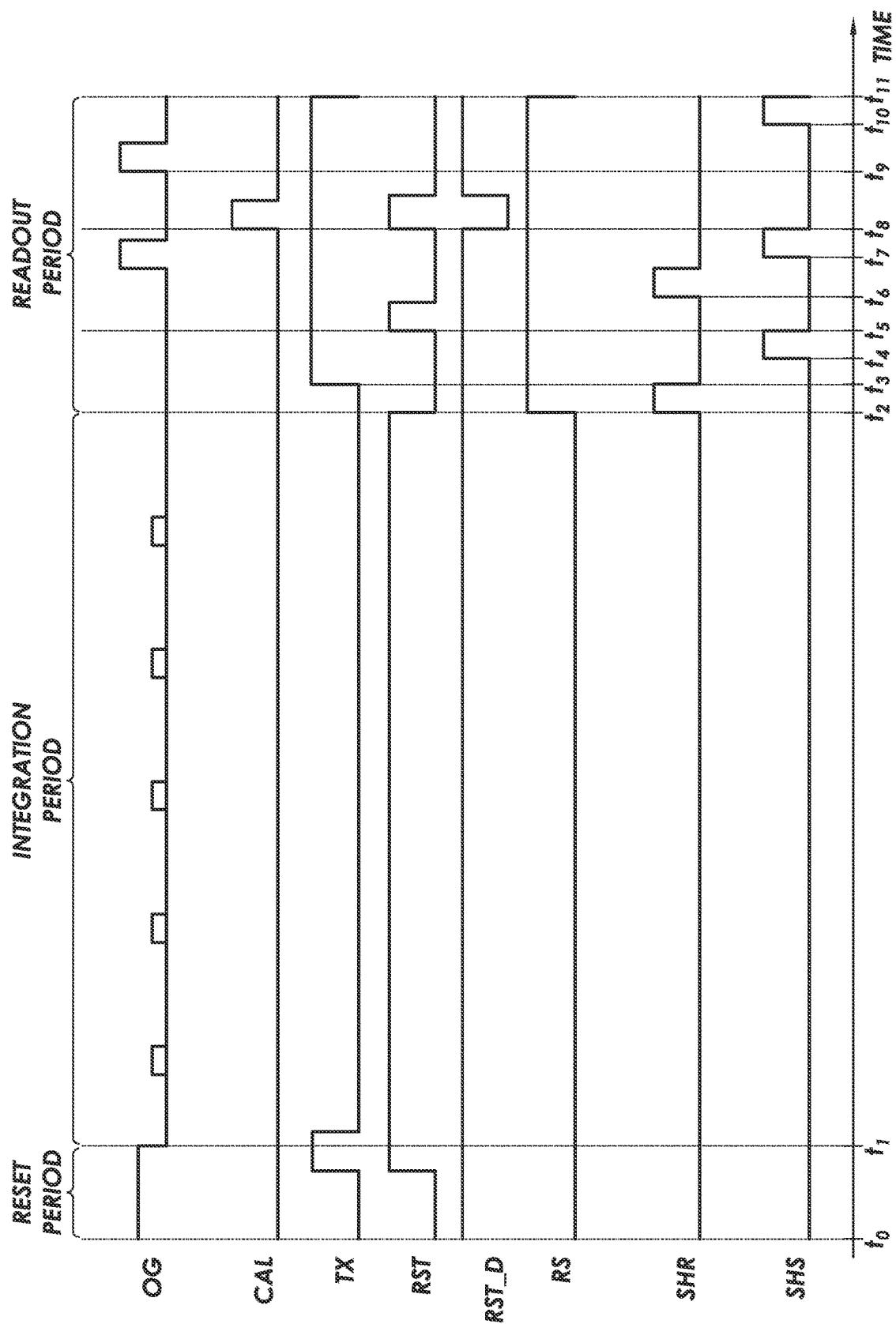
FIG. 12 is a timing diagram showing an illustrative method of operation for an imaging pixel such as the imaging pixel in FIG. 11 in accordance with some embodiments.

FIG. 12 is a timing diagram showing illustrative operation of imaging pixel 34 in FIG. 11. Between $t_0$ and $t_1$, the capacitor 110 and photodiode 102 are both reset by raising control signals OG, TX, and RST, to assert transistors 105, 104, and 106, respectively.

After the reset period there is an integration period between $t_1$ and $t_2$. During the integration time, charge is generated and accumulates (integrated) in photodiode 102. Transistor 105 may be continuously or repeatedly partially pulsed (e.g., by holding OG at an intermediate voltage) during the integration period to allow charge from photodiode 102 to overflow through transistor 105 to capacitor 110. As shown in FIG. 5, transistor 105 may optionally be pulsed one or more times during the integration period. Repeatedly pulsing transistor 105 (e.g., repeatedly asserting and deasserting the transistor) may ensure effective charge overflow from photodiode 102 into capacitor 110 while mitigating dark current. Instead of or in addition to pulsing transistor 105, transistor 105 may include a buried implant that allows charge from photodiode 102 to overflow through transistor 105 to capacitor 110.

Next, readout operations may be performed. First, a correlated double sampling of the charge in photodiode is performed. At $t_2$, the reset level of floating diffusion region 118 is sampled (as indicated by the pulse in sample-and-hold-reset SHR). Transfer transistor 104 is then asserted at $t_3$ to transfer charge from photodiode 102 to floating diffusion region 118. At $t_4$, the signal level of floating diffusion region 118 is sampled (as indicated by the pulse in sample-and-hold-signal SHS). These two samples may be used for correlated double sampling of the charge in the photodiode.

Second, a correlated double sampling of the charge in the capacitor is performed. At $t_5$, reset transistor 106 is asserted. At $t_6$, the reset level of floating diffusion region 118 is sampled (as indicated by the pulse in sample-and-hold-reset SHR). At $t_7$, the overflow transistor 105 is asserted (while transistor 104 is asserted) to transfer charge from capacitor 110 to floating diffusion region 118. The signal level of floating diffusion region 118 is then sampled (as indicated by the pulse in sample-and-hold-signal SHS). These two samples may be used for correlated double sampling of the charge in the capacitor.

Finally, a calibration operation may be performed between $t_8$ and $t_{11}$. At $t_8$, RST_D is dropped to a voltage that is below the pinning voltage of photodiode 102. At the same time, calibration transistor 142 and reset transistor 106 are asserted (by raising control signals CAL and RST respectively). Next, at $t_9$, transistor 105 is asserted (while transistor 104 is asserted). Finally, at $t_{10}$, the signal level of floating diffusion region 118 is sampled (as indicated by the pulse in sample-and-hold-signal SHS). This calibration operation allows for the pinning voltage of the photodiode to be read out from the floating diffusion region.

If desired, any of the pixels herein may be split between two or more stacked substrates. In FIG. 3, a conductive interconnect may be positioned between transistor 104 and floating diffusion region 118 at location 134 (with the components to the left of location 134 in FIG. 3 incorporated in a first semiconductor substrate and the components to the right of location 134 in FIG. 3 incorporated in a second semiconductor substrate). In FIG. 4, a conductive interconnect may be positioned at location 134 between transistors 104-0, 104-1, 104-2, and 104-3, and floating diffusion region 118. Floating diffusion region 118, reset transistor 106, source follower transistor 112, row select transistor 132, column output line 116, and voltage supplies 124-2 and 124-3 may be incorporated in a first semiconductor substrate whereas the remaining components of the four respective sub-pixels may be incorporated in a second semiconductor substrate.

The foregoing is merely illustrative and various modifications can be made to the described embodiments. The foregoing embodiments may be implemented individually or in any combination.

What is claimed is:

1. A method of operating an imaging pixel that comprises a photodiode, a floating diffusion region, a first transistor coupled between the photodiode and the floating diffusion region, a capacitor, a second transistor coupled between the photodiode and the capacitor, a voltage supply, and a third transistor coupled between the floating diffusion region and the voltage supply, the method comprising:
during a first portion of a reset period, asserting the first, second, and third transistors while the voltage supply provides a voltage at a first magnitude that is less than a pinning voltage of the photodiode; and
during a second portion of a reset period, asserting the first and third transistors while the voltage supply provides the voltage at a second magnitude that is greater than the pinning voltage of the photodiode.

2. The method defined in claim 1, further comprising:
during an integration period, storing charge at the photodiode and the capacitor.

3. The method defined in claim 2, further comprising:
during the integration period, pulsing the second transistor to an intermediate level.

4. The method defined in claim 3, further comprising:
during a readout period that is subsequent to the integration period, sampling a first reset level.

5. The method defined in claim 4, further comprising, during the readout period:
asserting the first transistor to transfer charge from the photodiode to the floating diffusion region; and
sampling a first signal level.

6. The method defined in claim 5, further comprising, during the readout period and after asserting the first transistor to transfer charge from the photodiode to the floating diffusion region:
asserting the first transistor and the second transistor; and
sampling a second signal level.

7. The method defined in claim 6, further comprising, during the readout period and after sampling the second signal level:
asserting the first, second, and third transistors while the voltage supply provides the voltage at the first magnitude;
asserting the first, second, and third transistors while the voltage supply provides the voltage at the second magnitude; and
sampling a second reset level.

8. The method defined in claim 1, wherein the imaging pixel comprises an additional voltage supply and wherein the capacitor is coupled between the additional voltage supply and the second transistor.

9. The method defined in claim 8, further comprising:
during the reset period and using the additional voltage supply, providing an additional voltage at a third magnitude.

10. The method defined in claim 9, further comprising:
during the integration period and using the additional voltage supply, providing the additional voltage at a fourth magnitude that is less than the third magnitude.

11. The method defined in claim 10, further comprising:
during a readout period and using the additional voltage supply, providing the additional voltage at a fifth magnitude that is less than the third magnitude.

12. The method defined in claim 11, wherein the fifth magnitude is greater than the fourth magnitude.

13. The method defined in claim 1, further comprising:
asserting the second transistor during the second portion of the reset period.

14. An imaging pixel, comprising:
a photodiode that has a pinning voltage;
a floating diffusion region;
a first transistor coupled between the photodiode and the floating diffusion region;
a capacitor;
a second transistor coupled between the photodiode and the capacitor;
a voltage supply configured to provide a voltage; and
a third transistor coupled between the floating diffusion region and the voltage supply, wherein the voltage supply is configured to, during a first portion of a reset period, provide the voltage at a first magnitude that is less than the pinning voltage and wherein the voltage supply is configured to, during a second portion of the reset period, provide the voltage at a second magnitude that is greater than the pinning voltage.

15. The imaging pixel defined in claim 14, further comprising:
an additional photodiode that has an additional pinning voltage;
a fourth transistor coupled between the additional photodiode and the floating diffusion region;
an additional capacitor; and
a fifth transistor coupled between the additional photodiode and the additional capacitor, wherein the first magnitude is less than the additional pinning voltage and wherein the second magnitude is greater than the additional pinning voltage.

16. The imaging pixel defined in claim 14, further comprising:
an additional capacitor;
a fourth transistor coupled between the additional capacitor and the capacitor, wherein the additional capacitor is connected to the photodiode in series with the capacitor.

17. The imaging pixel defined in claim 14, further comprising:
an additional capacitor;
a fourth transistor coupled between the additional capacitor and the photodiode, wherein the additional capacitor is connected to the photodiode in parallel with the capacitor.

18. The imaging pixel defined in claim 14, further comprising:
an additional capacitor;
a fourth transistor coupled between the additional capacitor and the floating diffusion region.

19. The imaging pixel defined in claim 14, further comprising:
a first semiconductor substrate that includes the photodiode, the first transistor, the capacitor, and the second transistor;

a second semiconductor substrate that includes the floating diffusion region, the voltage supply, and the third transistor; and a conductive interconnect that electrically connects the first transistor in the first semiconductor substrate to the floating diffusion region in the second semiconductor substrate.

20. A method of operating an imaging pixel that comprises a photodiode, a floating diffusion region, a first transistor coupled between the photodiode and the floating diffusion region, a capacitor, a second transistor coupled between the photodiode and the capacitor, and a voltage supply, wherein the capacitor is coupled between the voltage supply and the second transistor, wherein the first and second transistors are connected in series between the capacitor and the floating diffusion region, and wherein the method comprises:

during a reset period and using the voltage supply, providing a voltage at a first magnitude;

during an integration period, storing charge at the photodiode and at the capacitor; and during a readout period and using the voltage supply, providing the voltage at a second magnitude that is less than the first magnitude.

21. The method defined in claim 20, wherein the photodiode is directly connected to a node and wherein the node is interposed between the first and second transistors.

22. The method defined in claim 20, wherein the capacitor has a first plate coupled directly to the voltage supply and wherein the capacitor has a second plate coupled directly to the second transistor.

* * * * *